(12) United States Patent
Eijt et al.

(10) Patent No.: US 7,485,223 B2
(45) Date of Patent: Feb. 3, 2009

(54) SEPARATOR DEVICE

(75) Inventors: Antonius Chartianus Johannes Eijt, Dinxperlo (NL); Arie Kluit, Lochem (NL)

(73) Assignee: Nijhuis Water Technology B.V., Dinxperlo (NL)

( * ) Notice: Subject to any disclaimer, the term of this patent is extended or adjusted under 35 U.S.C. 154(b) by 0 days.

(21) Appl. No.: 11/578,804

(22) PCT Filed: Apr. 15, 2005

(86) PCT No.: PCT/NL2005/000282

§ 371 (c)(1),
(2), (4) Date: Jul. 12, 2007

(87) PCT Pub. No.: WO2005/099857

PCT Pub. Date: Oct. 27, 2005

(65) Prior Publication Data

US 2007/0256964 A1 Nov. 8, 2007

(30) Foreign Application Priority Data

Apr. 16, 2004 (EP) .................................. 04076165

(51) Int. Cl.
*C02F 1/24* (2006.01)
*B01D 21/02* (2006.01)
*B01D 17/028* (2006.01)
(52) U.S. Cl. ..................................... 210/221.2; 210/522
(58) Field of Classification Search .............. 210/221.2, 210/221.1, 521, 522
See application file for complete search history.

(56) References Cited

U.S. PATENT DOCUMENTS 4,160,737 A * 7/1979 Pielkenrood ................. 210/202

(Continued)

FOREIGN PATENT DOCUMENTS

DE 299 12 194 U1 12/1999

(Continued)

OTHER PUBLICATIONS

International Search Report corresponding to PCT application No. PCT/NL2005/000282 completed Jul. 5, 2005 mailed by the European Patent Office on Aug. 3, 2005.

*Primary Examiner*—Thomas M Lithgow
(74) *Attorney, Agent, or Firm*—Abelman, Frayne & Schwab

(57) ABSTRACT

The invention relates to a separator device for separating a first liquid substance from a second substance, the two substances forming a mixture. The apparatus comprises a vessel with an inlet for receiving the mixture, a first outlet for discharge of a first fraction of the mixture, a second outlet for discharge of a second fraction of the mixture and a flow element. The flow element comprises a number of parallel tubular channels defining a flow path for the mixture, the channels having an gilet end for receiving the mixture and an outlet end for discharge of the first fraction, a length direction of the channels being inclined with respect to a horizontal direction, wherein in a transverse cross section through the flow element, the channels form a two-dimensional array of closed cells, each cell defining a boundary of a flow channel, the cells being arranged in at least two rows, each cell in a first row contacting with its perimeter a cell in the second row. The device comprises a return duct from a first outlet to the inlet via a gas mixing device.

17 Claims, 3 Drawing Sheets

U.S. PATENT DOCUMENTS

Figure 1A:
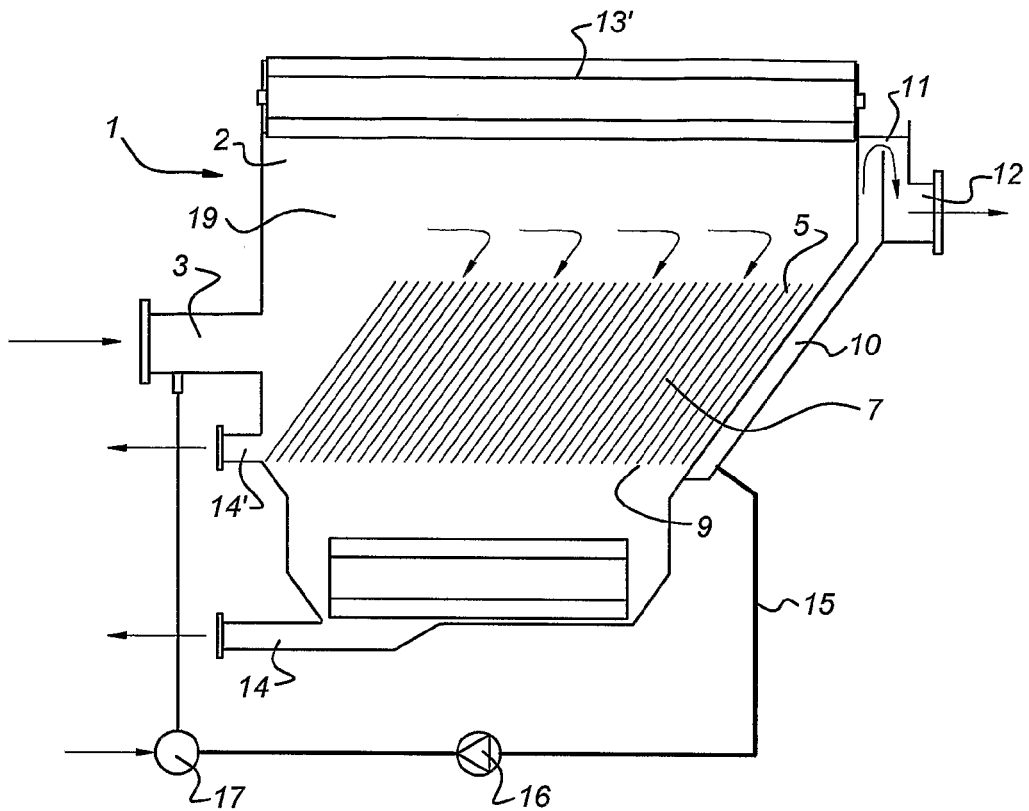

| | | | |
|---|---|---|---|
| 5,156,745 A | 10/1992 | Cairo, Jr. et al. | |
| 5,296,149 A | 3/1994 | Krofta | |
| 5,320,750 A * | 6/1994 | Krofta | 210/221.2 |
| 6,174,434 B1 | 1/2001 | Krofta | |
| 6,217,777 B1 * | 4/2001 | Dahlquist et al. | 210/703 |
| 2002/0179506 A1 | 12/2002 | Bohn et al. | |

FOREIGN PATENT DOCUMENTS

| | | |
|---|---|---|
| EP | 0 423 964 A1 | 9/1990 |
| EP | 1 193 342 | 4/2002 |
| EP | 1 297 877 A2 | 9/2002 |
| GB | 1 238 489 | 7/1971 |
| GB | 1 535 591 | 12/1978 |

* cited by examiner

SEPARATOR DEVICE

BACKGROUND OF THE INVENTION

1. Field of the Invention

The invention relates to a separator device for separating a first liquid substance from a second substance, the two substances forming a mixture, the apparatus comprising:

a vessel with an inlet for receiving the mixture, a first outlet for discharge of a first fraction of the mixture, a second outlet for discharge of a second fraction of the mixture, and a flow element comprising a number of parallel tubular channels defining a flow path for the mixture, the channels having an inlet end for receiving the mixture and an outlet end for discharge of the first fraction, a length direction of the channels being inclined with respect to a horizontal direction, wherein in a transverse cross-section through the flow element, the channels form a two-dimensional array of closed cells, each cell defining a boundary of a flow channel, the cells being arranged in at least two rows, each cell in a first row contacting with its perimeter a cell in the second row.

2. Description of the Related Art

Such a separator device is known from GB 1 238 489 that describes a settling tank in which a settelable material is removed from a liquid by feeding it into the plenum of a honeycomb structure comprising a plurality of elongated conduits which are disposed between the inlet plenum and an outlet plenum and which are inclined upwardly at an angle of not more than 35 degrees to the horizontal. The liquid flow rate is from the lower end of the inclined conduits to an upper end, and is such that the liquid assumes a streamlined flow condition facilitating depositing material in the conduits.

The known device has as a disadvantage that floatable solid or liquid fractions, such as for instance grease or oil, of the mixtures which do not tend to form sediment cannot be effectively separated.

It is an object of the present invention to provide a separator device in which not only heavy fractions which form a sediment can be separated from a liquid, but in which also lighter fractions can be effectively separated from a liquid mixture. It is another object of the present invention to provide a separator device of the above-mentioned type which has a relatively large throughput, and a large separating efficiency. It is a further object of the present invention to provide a separator device in which the level can be fixed independently of the flow through rate and in which the possibility of flushing is provided.

SUMMARY OF THE INVENTION

Hereto the separator device according to the present invention is characterised in that:

the separator device comprises a return duct in fluid connection with the first outlet, and connected to the inlet via a gas mixing device;

an upper side of the flow channels being in fluid communication with the inlet for forming a flow path for the mixture from the upper to a lower part of flow channels; and the second outlet being situated at an upper part of the separator device in fluid communication with the upper part of the flow channel, a flow path for gas and the second fraction of the mixture extending from a lower part to an upper part of the flow channels.

By using a gas floatation separator device and feeding the mixture from the upper end to the lower end of the inclined flow channels, air bubbles can rise upwards entraining floatable material to the second outlet, at an upper end of the apparatus, whereas a waterous fraction can be collected near the lower end of the flow channels and can be removed at the first outlet and be recycled to the inlet via the gas mixing device. Sediment will travel downwardly along the inclined flow channels. Effective separation of both floatable and sediment forming materials can be obtained at a relatively high throughput as laminar flow conditions will be maintained in the enclosed flow channels.

A floatation device is known from EP 1 193 342. In this publication, a floatation device is described with a vessel of generally cylindrical construction which at its bottom comprises an inlet for admitting a mixture of substances, including entrapped gas (air). The mixture rises upwards through a central channel in an axial direction and is deflected in a radial direction along a number of baffles. The baffles are formed by a number of conical plates arranged at an angle with respect to the axial direction, along the central channel. Each baffle is formed by two side plates with an internal reinforcing structure, such as a honeycomb structure. The reinforcing structure forms a flow channel through which the mixture of substances may flow in a radial direction towards the side of the cylindrical vessel. From the side, the separated first fraction, such as water, is transported to a first outlet. In the flow channels of the baffles, as well as in the space between the baffles, the entrapped gasses may rise upwards and entrain a first fraction, such as oil or grease, against the radial flow direction back to the central channel to be collected in a second outlet.

It is also known to utilise in a separator device for air floatation, as a flow element a stack of parallel, corrugated plates, defining flow channels for separation of the fractions in the mixture. The stack of plates is inclined at an angle of about 60 degrees with the horizontal. In the known air floatation device, air is dissolved under pressure in the range of 300 to 600 kPa in a recycled water stream. Just before the aerated water is mixed with waste water, containing floatable matter (oil, grease or floc) the pressure is released to produce a large number of small air bubbles which adhere to the pollutants and assist these pollutants to separate from the mixture in an upward direction in the flow element.

In order to obtain a good separation, the overflow rate of the mixture of substances that is to be separated over the flow unit ($m^3$/h of waste water per $m^2$ of surface area of the flow unit) must match the rise rate of the particles. The efficiency of the separator unit hence depends on the amount of surface area of the flow unit. In the known air floatation device, the flow rate is such as to maintain laminar flow conditions in the flow channels. Under these conditions, the flow velocity in the flow channels of the flow unit is zero at the walls of the corrugated channels, and air with entrapped pollutants can rise against the flow direction, upwards along the plates to the second outlet, to be removed from the separator.

By forming a two-dimensional array of enclosed flow channels, according to the present invention, the channels have a decreased hydraulic diameter, and hence a lower Reynolds number. The small hydraulic diameter allows the Reynolds number of the flow element of the present invention to remain low during operation which means that laminar flow conditions can be maintained even at high flow rates, while maintaining a favourable upwards rise rate of air bubbles and floatable material entrained by the bubbles through the flow channels. Hence the flow rate can be increased in the floatation device of the present invention while maintaining proper separation.

In contrast to EP 1 193 342, wherein the flow channels are mainly used as a reinforcement for the baffles, and in which the main flow channels are formed by the space between adjacent parallel baffles, which space has larger hydraulic diameter and hence larger Reynolds number, the present invention provides a two-dimensional array of contiguous flow channels, providing decreased Reynolds numbers over the cross section of the flow element.

The cells in the flow element may have mutually different cross-sections and different dimensions. The flow element may be formed as an integral unit of interconnected, parallel channels.

The two-dimensional array of cells in the cross section of the flow element of the present invention may comprise cells of cylindrical cross-section, but preferably comprises cells of rectangular cross section. The rectangular cells may be arranged at an angle of 45 degrees with a corner facing upward, such that a travel path for entrained particles, such as sand or debris is formed along such a corner.

In a preferred embodiment, the cells are of hexagonal shape, such that a honeycomb structure is formed. Compared to a stack of parallel plates, for which the hydraulic diameter corresponds to about twice the plate distance, the hydraulic diameter of a hexagonal channel is about equal to the distance between two parallel planes, such that the Reynolds number is about halve the Reynolds number for the plates.

In one embodiment, the separator comprises a top part having a substantially vertical boundary wall, and a slanting boundary wall, the flow element extending at least substantially up to the slanting boundary wall, the flow channels extending substantially parallel to the slanting boundary wall.

The separator device comprises in its upper part a level sensor, the first outlet being situated in a lower part of the slanting boundary wall, and comprising a controlled valve which receives as an input a control signal generated by the level sensor.

By use of a level controlled valve, a separate effluent compartment and overflow weir can be omitted, allowing additional room in the separator device for additional flow channels, hence increasing the capacity of the unit. Another advantage of using a level controlled valve for removal of treated substance from the separator device, is that a fixed fluid level is obtained which is independent of the flow rate. This in contrast to the use of an overflow weir, which produces a higher level at higher flow rates. Furthermore, the level controlled valve allows an increase in fluid level at the end of a cycle to discharge all floated matter before shut down.

BRIEF DESCRIPTION OF THE DRAWGINGS

Figure 1B:
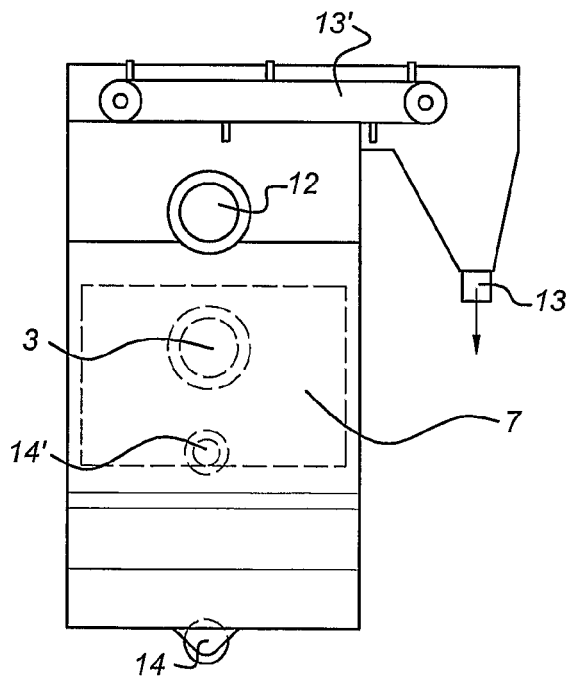
Figure 2:
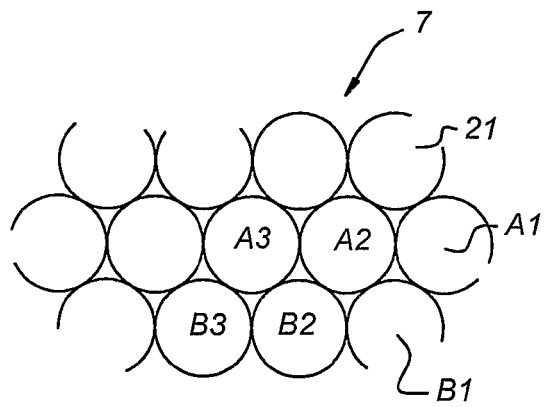
Figure 3:
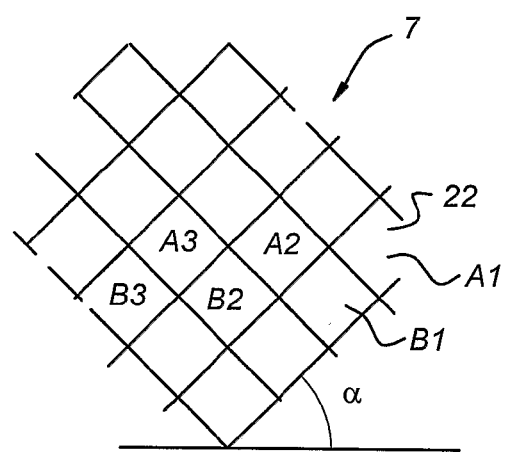
Figure 4:
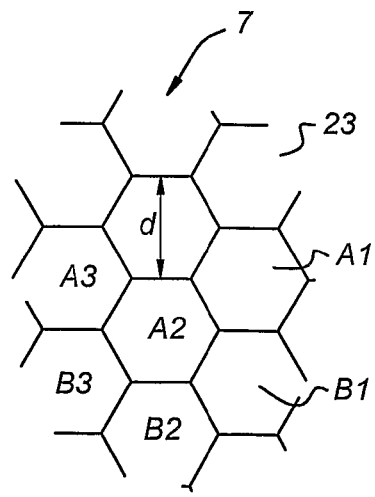
Figure 5:
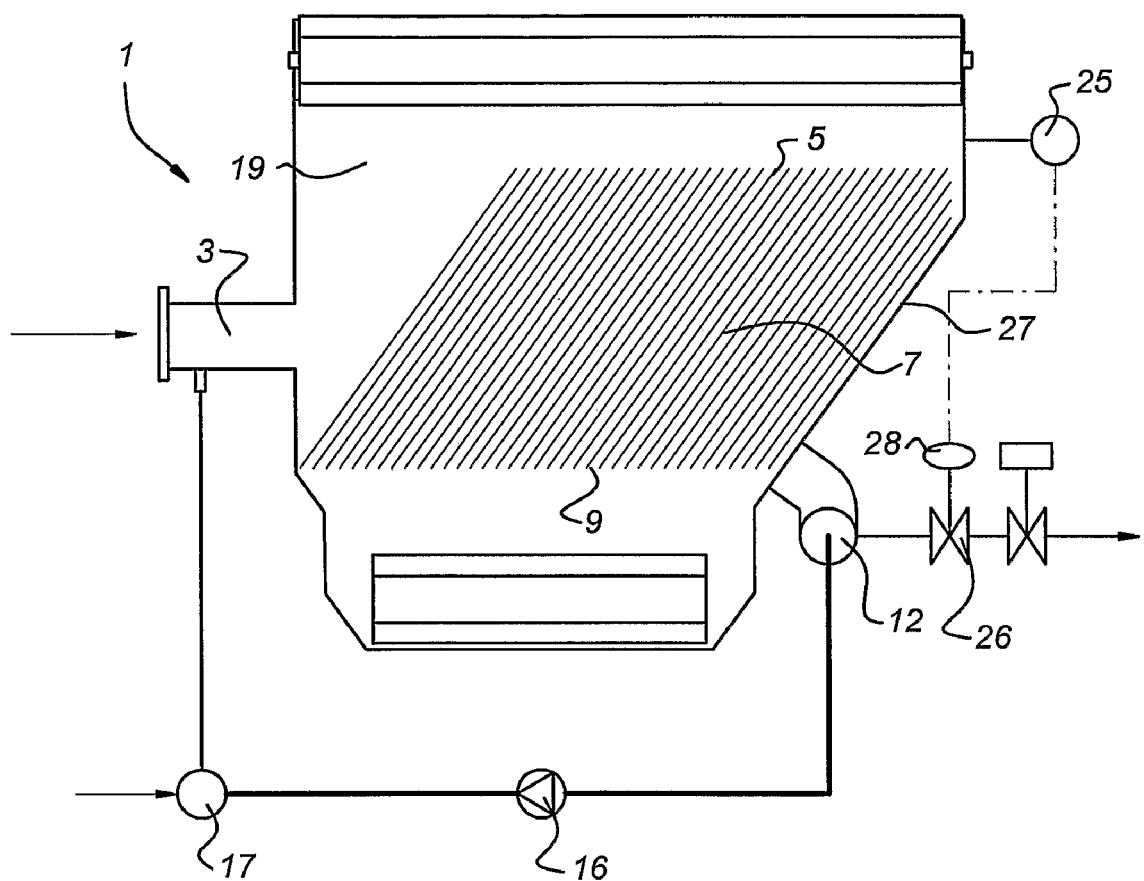

Some embodiments of a separator device according to the present invention will be explained in detail with reference to the accompanying drawings. In the drawings:

FIGS. 1A and 1B show a frontal view and side view, respectively of a separator device according to the present invention, FIGS. 2-4 show different cross-sections of a flow element of the present invention, and FIG. 5 shows a separator device according to the present invention comprising a level controlled valve.

DETAILED DESCRIPTION OF THE PREFERRED EMBODIMENT

FIG. 1 shows a separator device 1, with an inlet 3 for receiving a mixture of substances, such as waste water. The mixture flows to an inlet end 5 of a flow element 7. The flow element 7 is schematically indicated in this figure, and comprises a 3-dimensional array of parallel flow channels. The flow channels are oriented at an angle to the horizontal, for instance at a slanting angle of 60°. From an outlet end 9 of the flow element 7, a first fraction of the mixture, such as water, flows through an upwardly extending channel 10 to an overflow weir 11, and from there to a first outlet 12. The second fraction, such as oil, grease or solids, is collected in compartment 19 and is discharged via a transport belt 13' through second outlet 13, shown in FIG. 1B. Heavy debris, such as sand, may be discharged through outlet 14. The separator device may be drained via outlet 14'. A return duct 15 is attached to the lower end of channel 10 and is via pump 16 connected to air mixing device 17. In the air mixing device, aerated water is formed at a pressure of 300 to 700 kPa, which aerated water is fed to the inlet 3 to be mixed with the mixture of substances to be separated.

Upon release of the pressure of the mixture of aerated water and the substances to be separated at the inlet 3, small air bubbles are formed in the substances to be separated, entraining floatable matter, which accumulates in the compartment 19 of the separator unit. The mixture of water and floatable matter flows vertically downward from inlet end 5 through the flow element 7, to the outlet end 9. Due to laminar flow, air bubbles rise upward against the flow direction, from the outlet end 9 to inlet end 5, entraining floatable matter upward to compartment 19.

As can be seen from FIG. 2, the cross-section through flow element 7 comprises an array of cells 21 with circular cross-section. The cells are arranged in contiguous rows A1-A3; B1-B3.

In FIG. 3, the cells comprise an array A1-A3; B1-B3 of congruent cells 22 of square cross-section which are arranged at an angle α of 45° relative to the horizontal. In such a manner, the air bubbles can travel along the pointed top parts of each channel, for properly entraining floatable matter or suspended particles such as sand.

In FIG. 4, the cells 23 are of hexagonal shape. The hydraulic diameter of the hexagonal cells is about equal to the distance d between the cells. The hydraulic diameter of two parallel plates is about twice the distance between the plates. The Reynolds number, which is defined as:

$$Re = \rho v d / \eta$$

wherein
$\rho$ is the density of the fluid in kg/m$^3$
v is the velocity in m/s
d is the hydraulic diameter (4 times the cross sectional area/circumference)
$\eta$ is the viscosity in Pa·s is directly proportional to the hydraulic diameter. The Reynolds number determines the regime wherein laminar flow conditions change to turbulent flow conditions. For proper separation and travel of entrapped air against the flow direction in the flow unit 7, laminar flow conditions are required. As the Reynolds number for the hexagonal cell arrangement in FIG. 4 is about two times lower than that for a parallel plate construction, the flow velocity, and hence the throughput can be increased.

In FIG. 5, it is shown that the channel 10 and overflow weir 11 of FIG. 1 have been omitted and that the flow element 7 extends up to the slanting wall 27 of the separator device 1. A level sensor 25 measures the level in the compartment 19 and controls a drive unit 28 of a controllable valve 26. By use of the level controlled valve 26, more flow channels in flow element 7 can be utilised. Level adjustment via the valve 26 is independent of the flow rate, as is the case when using the overflow weir 11 shown in FIG. 1. Furthermore, operation of the valve 26 can be utilised to increase the water level prior to shut down to flush out all floated matter.

The invention claimed is:

1. Separator device (1) for separating a first liquid substance from a second substance, the two substances forming a mixture, the apparatus comprising:
    a vessel (2) with an inlet (3) for receiving the mixture,
    a first outlet (12) for discharge of a first fraction of the mixture,
    a second outlet (13) for discharge of a second fraction of the mixture, and
    a flow element (7) comprising a number of parallel tubular channels defining a flow path for the mixture, the channels having an inlet end (8) for receiving the mixture and an outlet end (9) for discharge of the first fraction, a length direction of the channels being inclined with respect to a horizontal direction, wherein in a transverse cross-section through the flow element, the channels form a two-dimensional array of closed cells (22), each cell defining a boundary of a flow channel, the cells being arranged in at least two rows ($A_1$-$A_3$, $B_1$-$B_3$) each cell in a first row contacting with its perimeter a cell in the second row, wherein
    the separator device comprises a return duct (15) in fluid connection with the first outlet, and connected to the vessel (2) via a gas mixing device (17),
    an upper side of the flow channels being in fluid communication with the inlet (3) for forming a flow path for the mixture from the upper to a lower part of flow channels,
    the second outlet (13) is situated at an upper part of the separator device in fluid communication with the upper part of the flow channels, a flow path for gas and the second fraction of the mixture extending from a lower part to an upper part of the flow channels,
    the inlet (3) is situated in a side surface of vessel (2) for entering the mixture into the upper of the vessel (2) in a sideways direction, and
    an outlet of the gas mixing device is connected to the inlet (3) for mixing air into the mixture prior to the mixture entering into the vessel (2),
    a level sensor (25) being situated is an upper part of the separator device, the first outlet (12) being situated in a lower part of the separator device and comprising a controlled valve (26) which receives as an input a control signal generated by the level sensor (25).

2. Separator device (1) according to claim 1, wherein the length of the flow channels are between about 50 cm and about 300 cm, preferably between about 120 cm and about 300 cm, a hydraulic diameter of the cells being between about 1 cm and about 10 cm.

3. Separator device (1) according to claim 2, wherein the inclination of the flow channels is a least 50 degrees.

4. Separator device (1) according to claim 3, further comprising a third outlet (14) at a lower end for removal of a sediment fraction.

5. Separator device (1) according to claim 4, wherein each row comprises at least 5 cells.

6. Separator device (1) according to claim 5, wherein the cells are rectangular.

7. Separator device (1) according to claim 5, wherein the cells are hexagonal.

8. Separator device (1) according to claim 6, wherein the cells are congruent.

9. Separator device (1) according to claim 7, wherein the cells are congruent.

10. Separator device (1) according to claim 2, wherein the inclination of the flow of channels is a least about 50 degrees.

11. Separator device (1) according to claim 1, further comprising a third outlet (14) at a lower end for removal of a sediment fraction.

12. Separator device (1) according to claim 1, wherein each row comprises at least 5 cells.

13. Separator device (1) according to claim 1, wherein the cells are rectangular.

14. Separator device (1) according to claim 1, wherein the cells are hexagonal.

15. Separator device (1) according to claim 13, wherein the cells are congruent.

16. Separator device (1) according to claim 14, wherein the cells are congruent.

17. Separator device (1) for separating a first liquid substance from a second substance, the two substances forming a mixture, the apparatus comprising:
    a vessel (2) with an inlet (3) for receiving the mixture,
    a first outlet (12) being situated in a lower part of the separator for discharge of a first fraction of the mixture, the first outlet (12) comprising a controlled valve (26) which receives as an input a control signal generated by a level sensor (25),
    second outlet (13) for discharge of a second fraction of the mixture, and
    a flow element (7) comprising a number of parallel tubular channels defining a flow path of the mixture, the channels having an inlet end (8) for receiving the mixture and an outlet end (9) for discharge of the first fraction, a length direction of the channels being inclined with respect to a horizontal direction, wherein a transverse cross-section through the flow of element, the channels form a two-dimensional array of closed cells (22), each cell defining a boundary of a flow channel, the cells being arranged in at least two rows ($A_1$-$A_3$, $b_1$-$B_3$), each cell in a first row contacting with its perimeter a cell in the second row, wherein
    the separator device comprises a return duct (15) in fluid connection with the first outlet, and connected to the vessel (2) via a gas mixing device (17),
    an upper side of the flow channels being in fluid communication with the inlet (3) for forming a flow path for the mixture from the upper to a lower part of flow channels,
    the second outlet (13) is situated at an upper part of the separator device in fluid communication with the upper part of the flow channels, a flow path for gas and the second fraction of the mixture extending from a lower part to an upper part of the flow channels,
    the inlet (3) is situated in a side of the vessel (2) for entering the mixture into the upper part of the vessel (2) a sideways direction, and
    an outlet of the gas mixing device is connected to the inlet (3) for mixing air into the mixture prior to the mixture entering into the vessel (2),
    the level sensor (25) being situated in an upper part of the separator device, the first outlet (12) being situated in a lower part of the separator device and comprising a controlled valve (26) which receives as an input a control signal generated by the level sensor (25).

* * * * *